United States Patent [19]

Bauer et al.

[11] Patent Number: 5,004,291
[45] Date of Patent: Apr. 2, 1991

[54] TOP FRAMEWORK OF A FOLDING TOP FOR VEHICLES

[75] Inventors: Theodor Bauer, Altenriet; Gerhard Zweigart, Aidlingen, both of Fed. Rep. of Germany

[73] Assignee: Daimler-Berg AG, Fed. Rep. of Germany

[21] Appl. No.: 223,368

[22] Filed: Jul. 25, 1988

[30] Foreign Application Priority Data

Jul. 24, 1987 [DE] Fed. Rep. of Germany ....... 3724532

[51] Int. Cl.⁵ ............................................. B60J 7/12
[52] U.S. Cl. .................................. 296/116; 296/121; 296/122
[58] Field of Search ............... 296/107, 109, 116, 117, 296/121, 122

[56] References Cited

U.S. PATENT DOCUMENTS 3,994,524  11/1976  Lehmann .................. 296/116 X
4,720,134  1/1988   Seifert ...................... 296/122 X

FOREIGN PATENT DOCUMENTS 2154955  9/1985  United Kingdom ............. 296/116

*Primary Examiner*—Dennis H. Pedder
*Attorney, Agent, or Firm*—Evenson, Wands, Edwards, Lenahan & McKeown

[57] ABSTRACT

The invention relates to a top framework of a folding top for vehicles, which comprises a trapezoidal main bow, which can pivot about a horizontally extending vehicle transverse axis. On both sides of the main bow in each case there is provided an at least one-piece lateral roof frame and a front roof frame interconnecting the lateral roof frames such that they can be deflected transversely outwards. The lateral roof frames are coupled to the main bow by further framework members in such a way that, during the shifting of the upright main bow, they are forcibly controlled into a stowage position near to the obliquely inclined strut sections of the lateral struts of the main bow. In order to retain substanially the width of the passenger compartment of the vehicle when the top is folded back, the inclined strut sections of the main bow run with an inward offset with respect to the lateral contour of the vehicle and clearly more steeply, and on the outside of the strut sections there is arranged on both sides of the vehicle a roof skin retaining rail which can be transferred from a stretching position lying essentially flush with the surface plane of the side wall into a folding position moved closer to the assigned strut section.

22 Claims, 7 Drawing Sheets

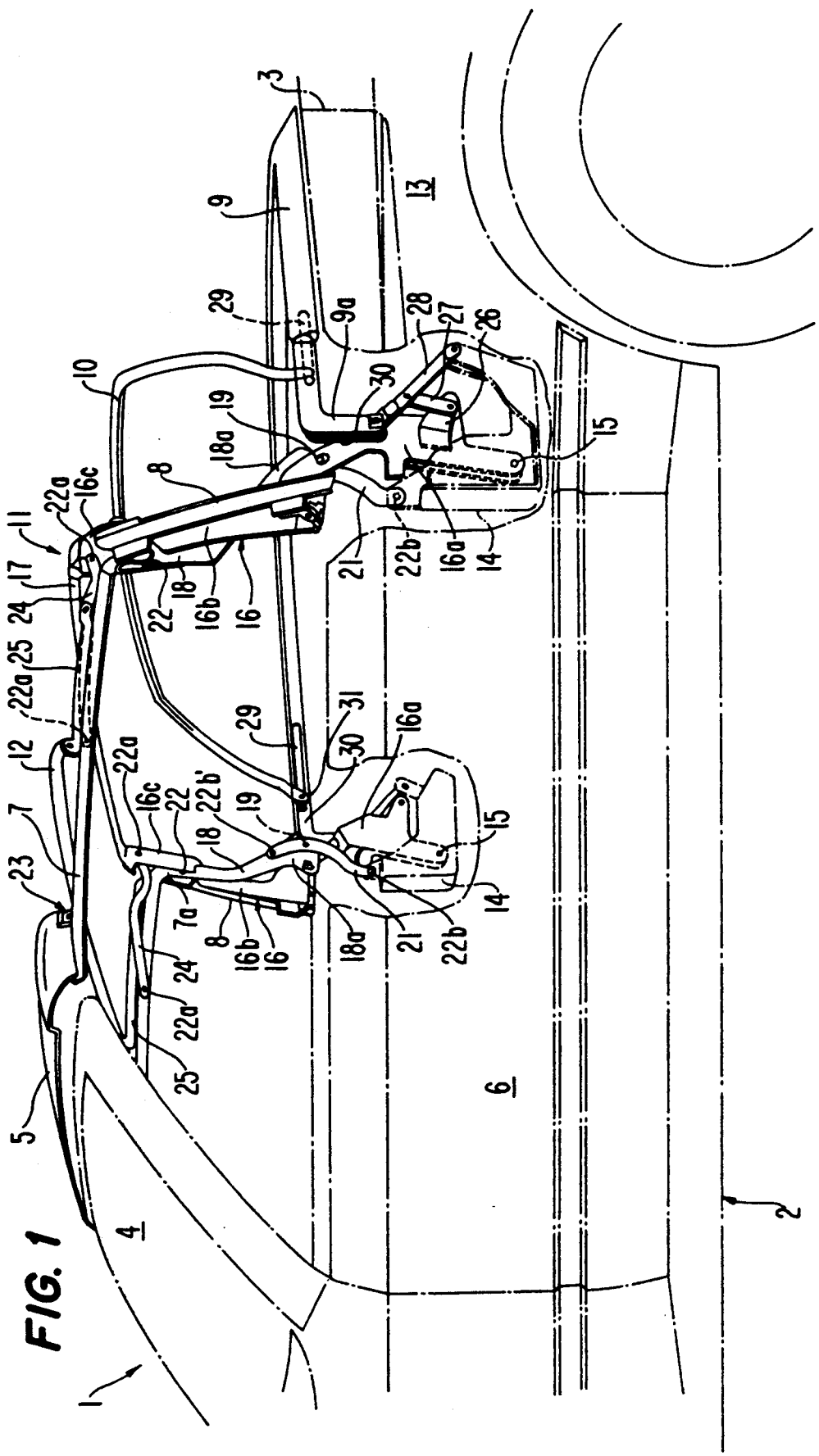

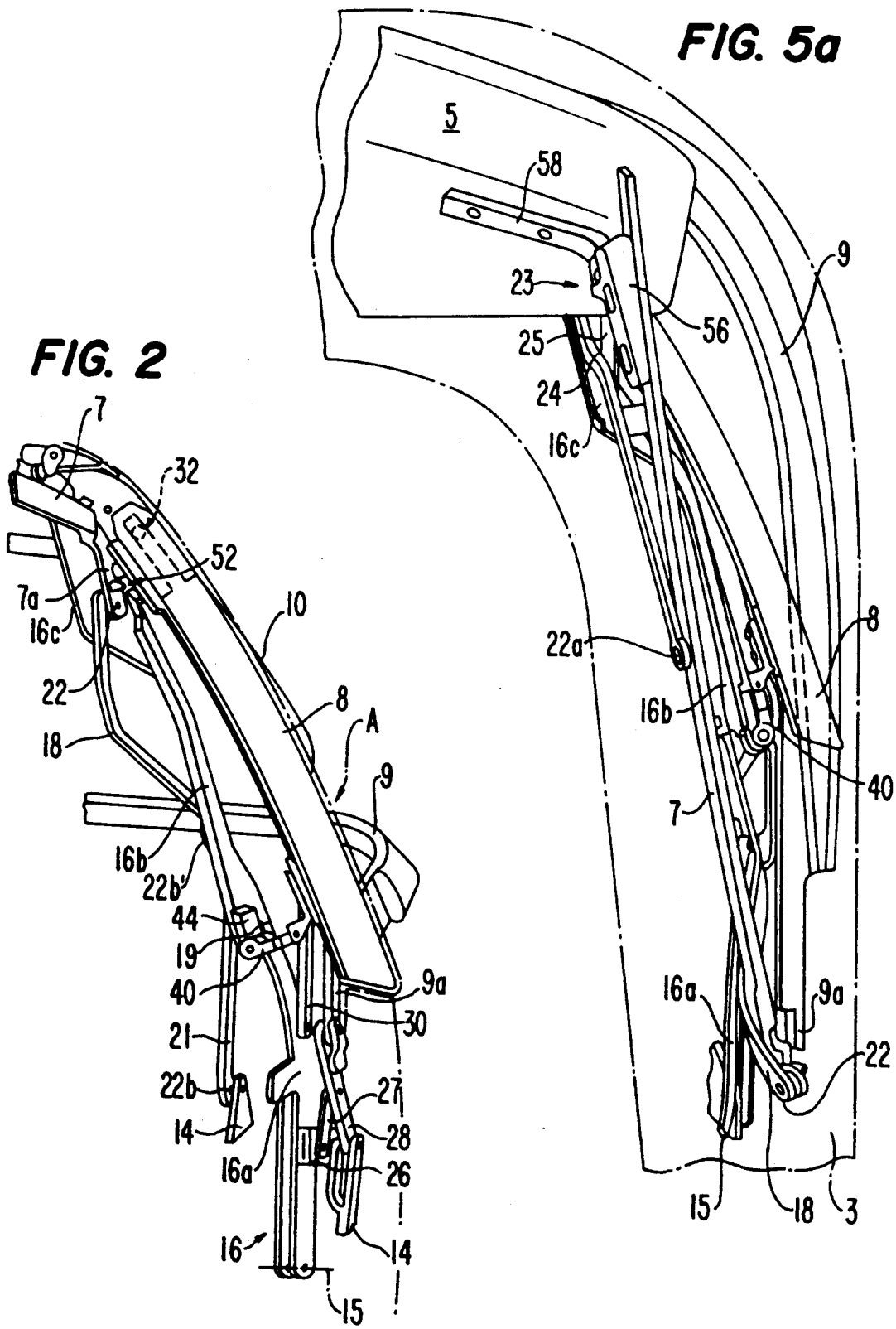

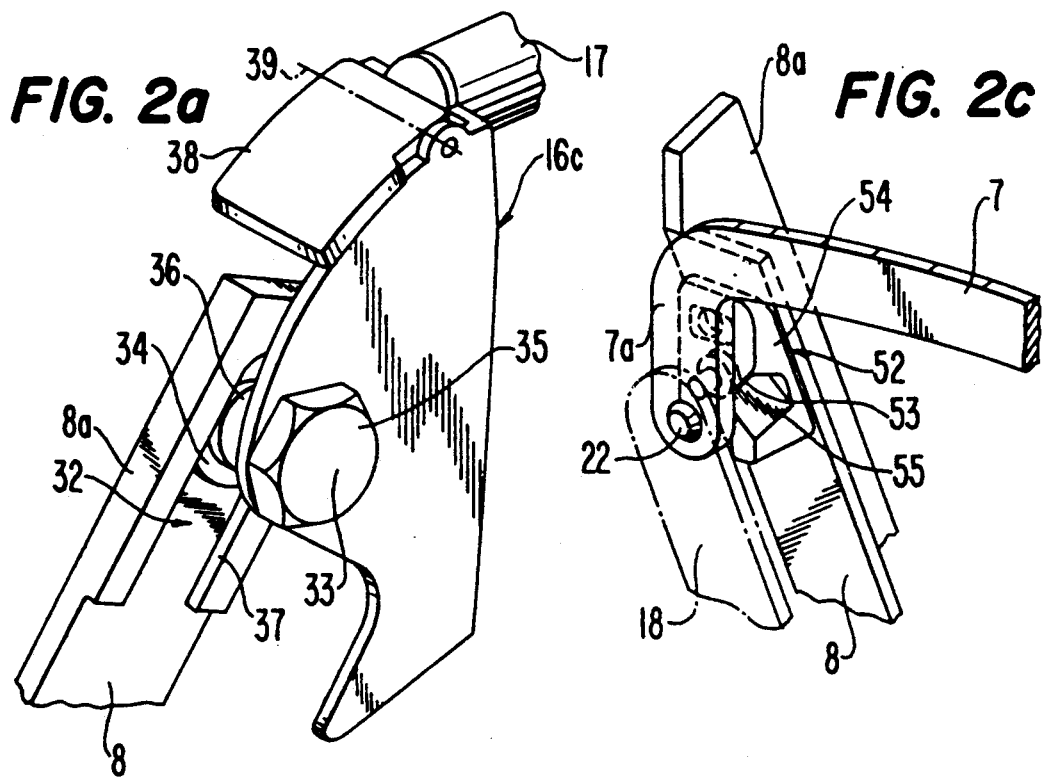
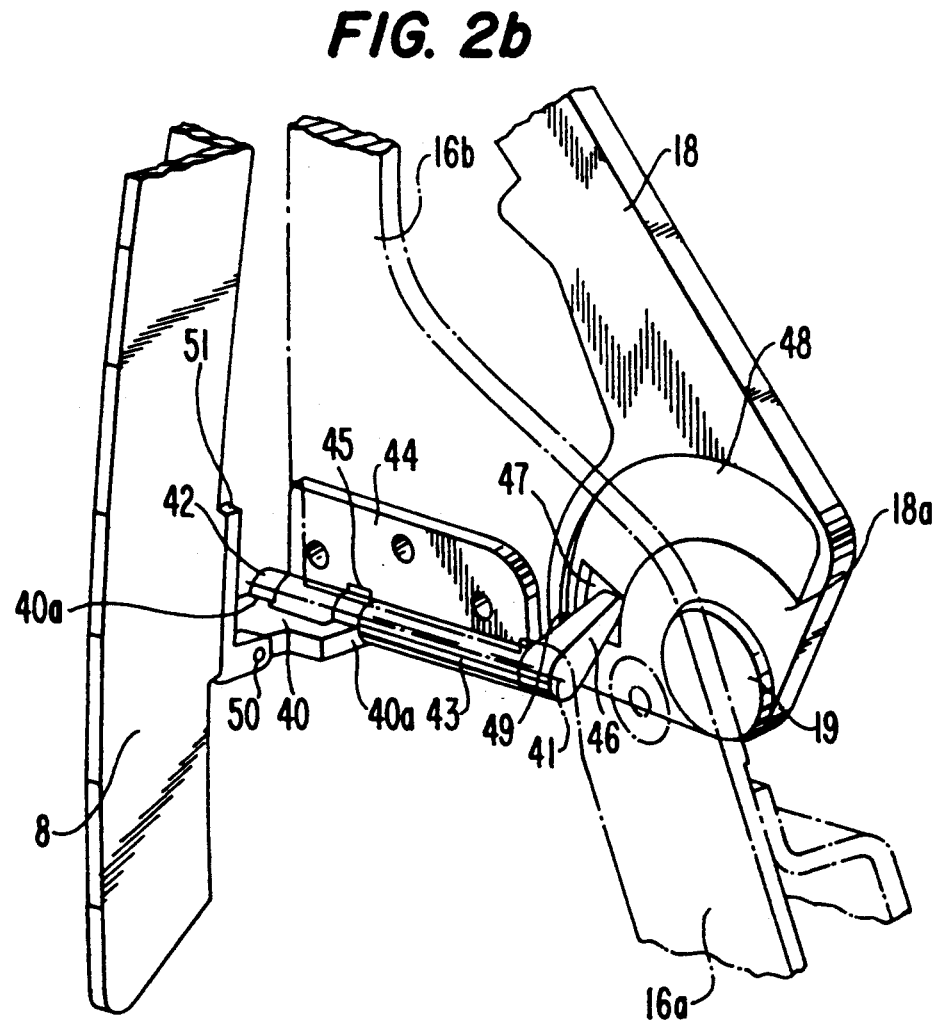

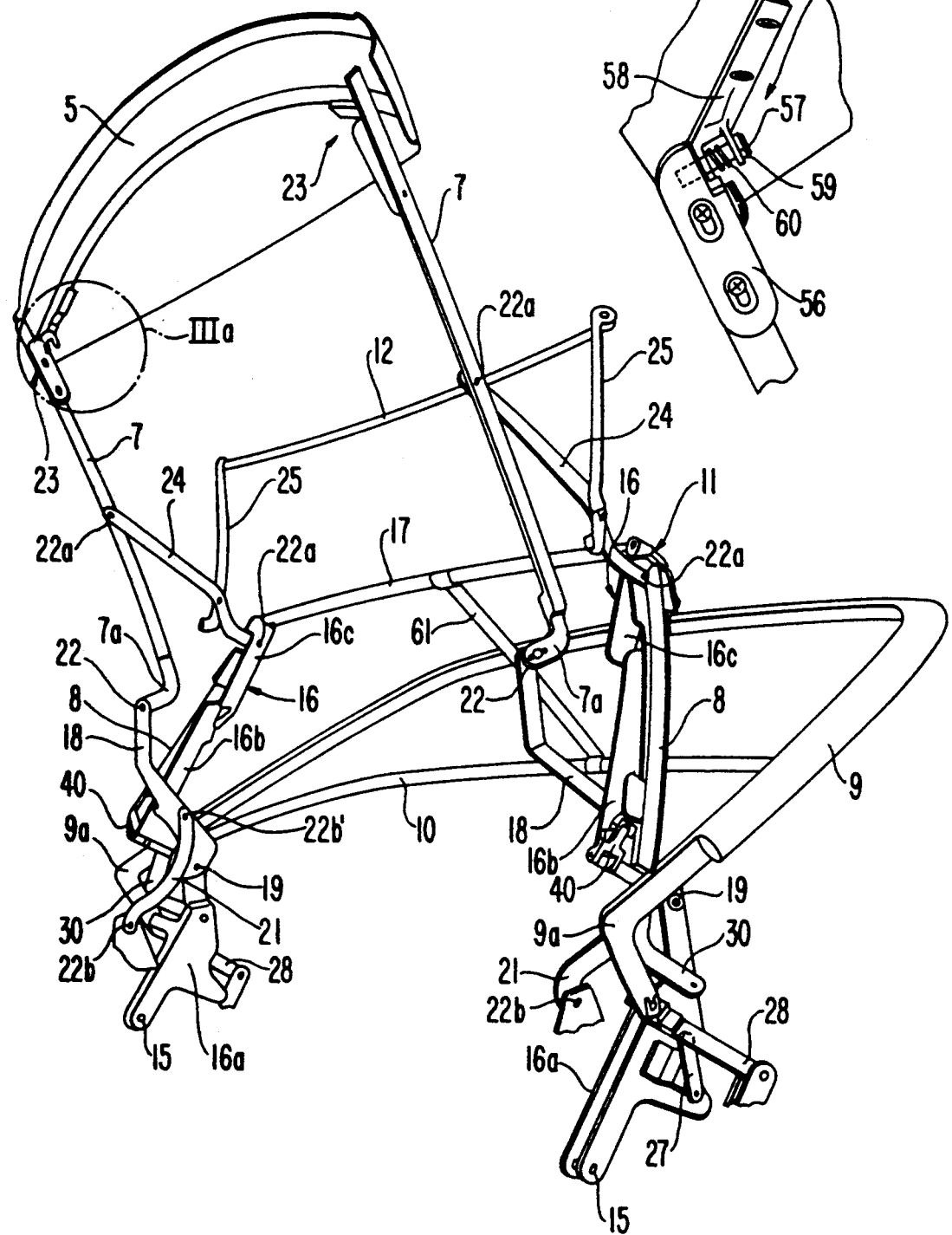

TOP FRAMEWORK OF A FOLDING TOP FOR VEHICLES

BACKGROUND AND SUMMARY OF THE INVENTION

The invention relates to a top framework of a folding top for vehicles of the type which comprises a trapezoidal main bow which can pivot about a horizontally extending vehicle transverse axis. Lateral roof frames extend in the vehicle longitudinal direction at both lateral sides of the main bow. A front roof frame interconnects the lateral roof frames such that they can be deflected transversely outward during top folding operations. Further framework members couple the lateral roof frames to the main bow in such a way that during shifting of the upright main bow the lateral roof frames are forcibly controlled into a stowage position adjacent to and substantially parallel to obliquely inclined struts sections of lateral struts of the main bow as viewed both in the vehicle transverse plane and in the vehicle longitudinal plane.

Such a top framework is described in German Patent Specification 3,405,920, which concerns an embodiment with two-piece lateral roof frames which can for their part be folded onto each other during the course of the lowering movement of the folding top The trapezoidal main bow of this top framework is in this case designed such that, with main bow upright, its lateral struts lay in the plane of the front side windows of the convertible, since they secure the textile covering behind the rear edges of the side windows.

In order not to confine unnecessarily the seating width in the rear seat area of the convertible by the lateral roof frames swivelled into the transverse plane of the main bow, the roof frames can be swivelled outwards into an associated compartment for the top during the course of the folding-in movement of the folding top, so that they are laid down directly alongside or on top of the assigned struts when the top is fully folded back.

However, the seating width on the rear seat bench is also confined to a slight ex tent by the main bow being of trapezoidal design. Due to the material retaining function of the struts, the extent of this seating width confinement depends directly on the lateral inclination of the side windows, so that with exactly vertically extending side windows there would be no seating width confinement whereas with an increasing angle of inclination with respect to the vertical direction of extent of the side window the fully available seating width also decreases to the same degree.

Furthermore, a folding top for vehicles in which the struts of the main bow themselves only indirectly secure the material of the top behind the side windows is known from German Patent Specification 3,523,433. For direct securing of the material of the top, there is mounted on each of both sides of the main bow a material retaining rail on the assigned strut, which rail can be swivelled out of an outwardly deflected stretching position, in which it predetermines the lateral inClination of the textile covering when the folding top is closed, into a swung-in folded position, in which it runs parallel or virtually parallel to the assigned strut.

The width reduction of the folding top associated with the folding-in of the material retaining rails makes it possible to lower said top into a trapezoidal compartment for the top which is integrated into a tapered vehicle rear end.

However, the width reduction of the folding top does not benefit the seating width in the rear seat area since the lateral extensions of the compartment for the top have to be dimensioned wide enough for the lateral roof frames, mounted around a horizontal vehicle transverse axis, to be capable of being swung into this compartment as well.

An object of the invention is to further develop a folding top of the type mentioned above for vehicles to the effect that the passenger compartment width of the vehicle is affected as little as possible by the area taken up by the folded-back folding top.

This object is achieved according to the invention by providing an arrangement wherein the inclined struts of the main bow extend with an inward offset with respect to the lateral contour of the vehicle and clearly more steeply, and wherein on the outside of the strut sections there is arranged on both sides of the vehicle a respective roof skin retaining rail which can be transferred from a roof skin stretching position lying essentially flush with a surface plane of the side wall into a folding position moved closer to the assigned strut section. Due to the clearly steeper course of the inclined strut sections in relation to the lateral inclination of the side windows, a better approximation of the trapezoidal main bow to the rectangular shape of the same, to be aimed for due to the complete constancy of width, is produced.

Since the roof skin retaining rails can be folded in, seen in the vehicle transverse plane of the main bow, out of an outwardly spread-apart stretching position into a position in contact with the assigned strut section, whereas the lateral roof frames can be swung out during the course of the folding-back operation of the top framework into an approximately parallel position next to the inclined strut sections, when the main bow is shifted completely over, a compact cluster of all side wall framework parts on both sides of the vehicle is produced, which in each case only takes up a minimal design width.

Since, in addition, the direction of extent of these clusters follows that of the steeply running strut sections, only very little passenger compartment width is lost by the folded-back top.

A further advantage of this design is to be seen in that the necessary transverse deflection of the lateral roof frames is greatly reduced, since the envisaged axial direction for the lateral roof frame articulation can no longer run approximately perpendicular to the lateral inclination of the side windows but approximately perpendicular to the direction of extent of the assigned strut sections. This results in an increase in the smoothness of the action of the top framework during folding back and at the same time makes possible a simplification of the connections between the lateral roof frames and the roof cap, which now only has to permit a clearly smaller transverse deflection.

If the length necessary in terms of design of the lateral roof frames is not clearly greater than the length of the struts of the top, the roof frames may each be designed as a continuous bar profile, providing a greater transverse stability of the lateral roof frames together with a simplification of the seal in the connection region to the upper edge of the side windows. However, a precondition for this design is a turning-over control for the combination of lateral roof frames and front roof frames which can however, be performed forcibly by means of a rod transmission constructed in accordance with preferred embodiments of the invention.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective schematic side view of a top framework of a convertible with closed top constructed in accordance with a preferred embodiment of the present invention;

FIG. 2 is a frontal view of the left-hand side wall framework according to FIG. 1;

FIG. 2a is an oblique side view of an upper connecting region of a roof skin retaining rail of the framework of FIGS. 1 and 2;

FIG. 2b is an oblique side view of the lower connection region of the roof skin retaining rail according to FIG. 2a;

FIG. 2c shows a lock of the roof skin retaining rail of the framework of FIGS. 1 and 2;

FIG. 3 is an oblique schematic view which shows the top framework according to FIG. 1 in a partially folded-back state;

FIG. 3a is an enlarged detail view which shows an articulation of the lateral roof frame on the roof cap of the framework of FIGS. 1-3;

FIG. 5a shows a plan view of the framework parts of the left framework side wall in its stowage position, corresponding to FIG. 5.

DETAILED DESCRIPTION OF THE DRAWINGS

Figure 4:
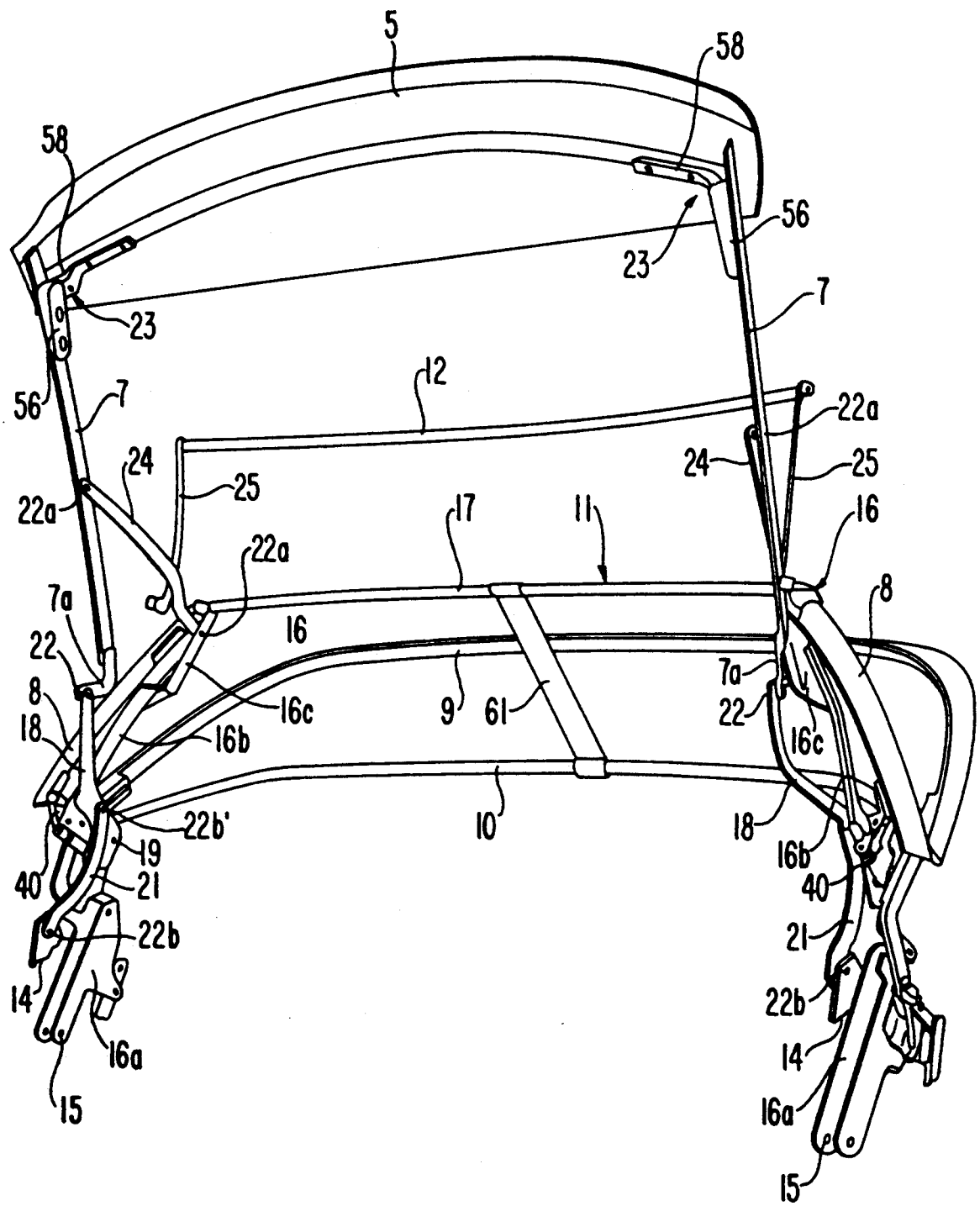
FIG. 4 is a frontal view of the top framework in a position corresponding to FIG. 3.

A convertible 1 illustrated in FIG. 1 comprises in the usual way an open, self-supporting vehicle bodywork super-structure 2, which is provided with a folding top which can be lowered completely into a compartment 3 for the top For reasons of clarity, only the supporting top framework has been represented, it being understood that this framework is to be covered with a flexible roof skin of textile material.

Reference is also made to commonly assigned application Ser. No. 07/223,367, filed on Aug. 25, 1988 and based on German Application No. P 37 24 533.3, filed in Germany on July 24, 1987 for further disclosure of certain features usable with preferred embodiments of the present invention.

In the arrangement of FIG. 1, the material of the roof skin is held behind the upper edge region of the wind screen 4 by means of a dimensionally rigid roof cap 5 and is held behind the upper window edge of the closed side windows (which cannot be seen in the drawing) of the side doors 6 by means of lateral roof frames 7. Lateral roof frames 7 are preferably one piece frame members which extend over the length of the top of the vehicle side windows. The roof skin is held behind the rear edge of the closed side windows by means of respective roof skin retaining rails 8 at both sides, and is held by means of a roof skin retaining bow 9 behind a top compartment cover (not shown—see above-mentioned related application) covering from above the compartment 3 of the top.

The roof skin retaining bow 9 forms the lower termination of the folding top, enclosing a rear seat area of the convertible 1 at the sides and rear by extending in the shape of a U. Seen in the direction of the width of the folding top, the material of the top is stretched tight by means of a corner bow 10, a main bow 11 and by means of an intermediate bow 12. The vertical arrangement of all the framework parts spanning the roof width relative to one another is in this case chosen such that When the material of the top is stretched, it at the same time produces a desired smooth-surfaced roof contour.

All framework parts mentioned are attached at least indirectly to brackets 14, arranged lowered laterally in the side-boards 13, since in these there is provided in each case a main bearing 15 for the struts 16 of the main bow 11. The axial direction of the main bearing 15 runs exactly perpendicular to the longitudinal center plane of the convertible 1, so that the main bow 11 can be shifted rearwards from its upright position shown, without stresses occurring at the main bearing 15. All other parts of the framework are forcibly controlled kinematically, dependent on the folding-back operation of the main bow 11.

In order to be able to clearly describe this folding-back operation it is first necessary to more closely consider the framework parts disposed in the side wall plane of the folding top. Only the left-hand parts of the framework are described more closely below for reasons of simplicity, these being mirror-symmetrical to the right-hand parts.

Viewed from the side, a bearing section 16a of the strut 16 extends upwards from the main bearing 15 in the shape of a fork. For reasons of stability the bearing section 16a is inclined rearwards somewhat with a slight deviation from the vertical direction. Approximately underneath the upper edges of the side-board 13, the bearing section 16a merges over into a strut section 16b designed as a flat profile. The strut section 16b extends further upwards, initially slightly obliquely forwards then, above the side-board upper edge, extends with a slight kink into a widened, approximately horizontally running partial section and finally ends in a vertically extending partial section, which extends behind (laterally inward of) the roof skin retaining rail 8. The upper end of the vertical partial section of the strut section 16b is welded to the assigned end of the bow tube 17 by means of a plate connecting flange 16c disposed therebetween, the plate connecting flange 16c also belonging to the strut 16. The strut section 16b thus extends downwardly more steeply than an upper portion of a lateral contour (shown in phantom lines in FIG. 2A) of the convertible 1 and with an inward offset therefrom.

On essentially the same level as the side-board upper edges, a main guide arm 18 is overhung on the strut section 16b, running along the inside of the same, by its lower end region, by means of a hinge joint 19. Starting from the hinge joint 19, the main guide arm 18 consists initially of a plate-shaped control cam 18a, the surface plane of which runs essentially parallel to that of the strut section 16b. Above the hinge joint 19, the control cam 18a merges into a narrower flat profile which extends forwards and upwards at an angle of approximately 40° with respect to the horizontal direction, until, after reaching the essentially vertical partial section of the strut section 16, it likewise adopts a vertical course, so that it is in alignment with the strut section 16. The upper end of the main guide arm 18 is connected by means of a ball joint 22 to the lower end of an end section 7a of the lateral roof frame 7 which is angled off downwards by approximately 90°. In order that the ball joint 22 can offer a support point for the lateral roof frame 7, the main guide arm 18 is positionally stabilized by means of a change-over guide arm 21. The change-over guide arm 21 consists of a flat profile running along the inside of the main guide arm 18, the upper end of which profile is attached by means of a ball joint 22b' to the main guide arm 18, and the lower end of which is likewise attached by means of a ball joint 22b to the bracket 14. The ball joint 22b on the bracket is offset forwards and upwards with respect to the main bearing 15 and the ball joint 22b' on the main guide arm is likewise arranged offset forwards and upwards with respect to the hinge joint 19. This change-over guide arm arrangement prevents the main guide arm 18 from being able to turn about the hinge joint 19 further forwards beyond the position shown, in particular under the effect of supporting forces in the ball joint 22.

The thus positionally fixed ball joint 22 has, through the hinge joint 19, an axial direction which runs transversely to the direction of extent of the strut section 16b virtually perpendicular to the swivelling plane of the latter. Underneath the bow tube 17, the adjoining end Section 7a clearly extends, at a fixed angle, into the lateral roof frame 7, which consists of a continuous, essentially straight flat-iron profile. In the front end region, the lateral roof frame 7 is connected by means of a transverse bearing 23, with essentially perpendicular axial direction, to the left end of the roof cap 5. To actuate the folding-back movement of the roof frame 7, a roof frame guide arm 24 is provided, running along the inside of the same. The roof frame guide arm 24 extends from the plate connecting flange 16c forwards, pointing slightly obliquely downwards. Its front end is in this case mounted approximately centrally on the lateral roof frame 7 and its rear end is mounted approximately underneath the bow tube 17 on the plate connecting flange 16c. Both end mounts are designed as ball joints 22a. In the end region of the roof frame guide arm 24 running above the roof frame 7, a rear end of a leaf-spring element 25 is pivotally attached. The leaf-spring element 25 extends forwards, approximately parallel to the direction of extent of the lateral roof frame 7, and is fastened at the end to the left end of the intermediate bow 12.

In order to couple the roof skin retaining bow 9 to the movement of the main bow 11, a welded-on angle link 26 juts out on the outside from the lateral side of the bearing section 16a and extends slightly obliquely rearwards, inclined downwards somewhat. A coupling bar 27, which is directed steeply upwards, is mounted at the rear end of the angle link 26. The upper end of the coupling bar 27 is jointedly mounted in the middle region of a thrust bar 28. The thrust bar 28 is for its part pivotally mounted with its rear end on the bracket 14 and with its front end on a downwardly angled-off leg 9a of the roof skin retaining bow 9, extending forward and at the same time obliquely upwards from the articulation on the bracket.

To uncouple the corner bow 10 from the advancement movement of the roof skin retaining bow 9, the lower ends of the corner bow 10 are in each case mounted by means of a sliding guide 29 in the assigned lateral leg of the roof skin retaining bow 9. In the clear profile cross-section of the lateral leg of the roof skin retaining bow 9 there also runs a sliding block, on which an angled-off guide lever 30 is mounted by its rear end. This produces a turning and sliding articulation 31 on the roof skin retaining bow. The guide lever 30 here lies in complete coverage on the inside of the angled-off leg 9a and also corresponds to the latter in its outwardly directed dimensions. Its lower end is attached above the angle link 26 on the lateral side of the bearing section 16a. Due to the articulation conditions existing, the roof skin retaining bow 9 is automatically displaced longitudinally forwards and lowered in the sense of a parallel displacement downwards into the compartment 3 for the top during the folding back of the main bow 11.

Seen from the front in conjunction with FIG. 2, the course of the left-hand parts of the framework in the vehicle transverse plane of the main bow 11 are clearly recognizable, the bow still being in a position coinciding with FIG. 1. The roof skin retaining rail 8 is furthest outwards and runs at a relatively flat angle of inclination, matched to the inclination of the side window (not shown). It consists of an angle profile of L-shaped cross-section, which is slightly bent. The narrow side of the outwardly directed leg in this case lies essentially flush with the side contour or lateral contour A (FIG. 2) at the bottom of the sidewall of the folding top since the material of the top is wrapped around the latter and stretched tight between the roof skin retaining rail 8 and the roof skin retaining bow 9.

Referred to the extent of the roof skin retaining rail 8, the strut 16 extends clearly more steeply on the inside of the same, the two being interconnected in the region of their top ends. The connection consists of a turning and sliding guide 32, which is functionally recognizable in conjunction with a rear view shown in FIG. 2a. For this purpose, the rearward lateral side of the upper end of the roof skin retaining rail 8 is covered by an extension of the plate connecting flange 16c jutting out in the vehicle transverse plane. In the region of coverage is located the turning and sliding guide 32, which comprises a cylinder bolt 34, defining a bearing axis 33, and a sliding piece 8a firmly connected to the roof skin retaining rail 8. The cylinder bolt 34 is axially braced by means of a fastening screw, which passes in a way which cannot be seen through an assigned bore in the extension of the connecting flange 16c, on the counter-surface of the same, and is thereby held fixedly. Facing the counter-surface of the extension, the cylinder bolt 34 has been machined down to a narrow front pin 36. The sliding piece 8a is designed as a hollow box profile, in other words with rectangular clear cross-section. The clear rectangular cross-section is in this case dimensioned such that it is slightly larger than the cross-section of the cylinder bolt 34 in the region of its greatest diameter. In addition, a longitudinal slit 37 with a U-shaped clear cross-section has been cut out from the rearward facing width side of the sliding piece 8a. The clear width of the longitudinal slit 37 is slightly larger than the diameter of the front pin 36. Since the material thickness of the walls limiting the longitudinal slit 37 is smaller than the axial length of the front pin 36, the sliding piece 8a is a guided axially and radially on the cylinder bolt 34. The bearing axis 33 runs parallel to the center longitudinal axis of the convertible 1, so that the roof skin retaining rail 8 is pivotally mounted in the transverse plane of the main bow 11.

In the longitudinal direction of advancement of the roof skin retaining rail 8, a deflector cap 38 is arranged a vertical distance above the end face of rail 8. Deflector cap 38 is mounted in the proximity of the bow tube 17 around a horizontal swivel axis 39 on the plate connecting flange 16c which axis 39 extends parallel to the bearing axis 33. This deflector cap 38 serves the purpose of keeping the roof skin resting on its upward facing side away from the turning and sliding guide 32, for which it has to be held in the initial position shown. In order to achieve this, in the region of its rear narrow side, the deflector cap 38 is widened, at least regionally, to the extent that it rests on the upward facing narrow side of the plate connecting flange 16c or its tang or extension.

Due to the longitudinal displaceability of the roof skin retaining rail 8, the turning and sliding guide 32 is insufficient for fastening the same alone on the strut 16. Therefore, a further support for the strut 16 is provided in its lower end region, which support lies somewhat above the side-board upper edge. Provided as supporting element is a spreader lever 40, which, bridging the considerable distance in this region between the strut section 16b and the roof skin retaining rail 8, both acts in a distancing way and transfers axial supporting forces onto the roof skin retaining rail 8.

As can be clearly recognized in conjunction with the view of the spreader lever arrangement obliquely from behind according to FIG. 2b, both ends of the spreader lever 40 are pivotally mounted for this purpose and the spreader lever 40 is blocked against swivelling in the position shown. It can be recognized here that a hinge axis 41, which is fixed to the strut 16 and extends parallel to the bearing axis 33 is defined by a hinge bolt 42 which is rotatably mounted in a bearing sleeve 43 of a hinge plate 44 fastened on the strut section 16b. The bearing sleeve 43 is not continuous but divided into two sleeve sections by a separating gap 45 in the front half of its longitudinal extent. The spreader lever 40 is designed in the shape of a fork where it faces the bearing sleeve 43, the fork ends 40a being connected fixedly in terms of rotation to the hinge bolt 42 in the region of the separating gap 45 on the one hand and in front of the bearing sleeve 43, from which a front end of the hinge bolt 43 protrudes, on the other hand. This type of articulation of the spreader lever 40 produces a particularly stable support of the roof skin retaining rail 8 in the region of its lower end with respect to tensile stress acting in the vehicle longitudinal direction on the roof skin retaining rail 8 through the material of the top. An end of the hinge bolt 42 protruding from the bearing sleeve 43 at the rear is connected fixedly in terms of rotation to a driving finger 46, which is of wedge-shaped design and protrudes from under the strut section 16b of the top transversely into the swivelling plane of the control cam 18a of the main guide arm 18. Its free end passes here through a through-opening 47, which is cut out from the opposite control cam 18a. This through-opening 47 is located at the front end of a ditch-like depression 48, which serves as a control track for the driving finger 46. In accordance with this intended purpose, the depression 48 extends on a circular path around the swivelling axis of the hinge joint 19, its longitudinal extent being matched to the relative deflection of the main guide arm 18 relative to the strut 16 occurring during folding back.

To create the through-opening 47, a link or tab 49 is disengaged or punched out from the bottom of the depression 48 and extended out into a transversely jutting-out blocking position facing the strut section 16b, in which position it engages underneath the driving finger 46. The tab 49 thus serves as a blocking stop, by which the driving finger 46 is reliably held in the position shown. The clear length of the through-opening 47 is dimensioned such that the engaging driving finger 46 can be tilted in it while maintaining the engagement if the main guide arm 18 is swung anti-clockwise relative to the strut 16. In addition, the clear depth of the depression 48 is matched to the length of the driving finger 46 in such a way that the free end of the driving finger 46 can be supported on the bottom of the depression 48 when the main guide arm 18 is swivelled further. As a result, the driving finger 46 is blocked in an obliquely downwards directed swivel position as long as the end of the driving finger 46 rests on the bottom of the depression 48.

In order to make it possible for the swivelling mobility of the spreader lever 40 dependent on the swivel position of the driving finger 46 to be torsion-fee, the end of the spreader lever 40 remote from the hinge bolt is connected by means of a hinge joint 50 to a retaining part 51 fixed to the roof skin retaining rail. In this arrangement, the hinge axis of the hinge joint 50 runs parallel to the hinge axis 41.

The spreader lever 40 is fixed by means of the driving finger 46 in the stretching position shown, jutting out approximately at right angles from the width side of the strut section 16b, in which position the roof skin (not shown) is stretched laterally by means of the roof skin retaining rail 8.

In order that, during travel operation, not all twists of the top framework under stress have to be absorbed by the joints of the spreader lever 40, an additional axial lock 52 is provided in the upper end region of the roof skin retaining rail 8. This axial lock 52 is clearly recognizable in conjunction with a partial inner view obliquely from the front according to FIG. 2c. Lock 52 comprises a transverse pin 53, jutting out rigidly from the rear end section 7a of the lateral roof frame 7, and an abutment 54, fixed to the roof skin retaining rail 8.

The transverse pin 53 is located vertically offset somewhat with respect to the ball joint 22 on the lateral side of the end section 7a facing the roof skin retaining rail 8 and has a conical shape in its direction of extent. It engages snugly in a clear entry cross-section 52 of the opposite abutment 54. The abutment 54 is of wedge-shaped design, matched to the angle formed between the roof skin retaining rail 8 and the longitudinal extent of the end section 7a, so that it lies flush with the lateral side of the end section 7a. The clear width of the entry cross-section 55 widens increasingly forwards (seen in vehicle longitudinal direction), from the seat of the transverse pin 53. This produces an automatic centering of the transverse pin 53 when the latter enters the assigned fork-shaped abutment during the course of the closing operation of the folding top. Once the transverse pin 53 has assumed its end position shown in the abutment 54, the roof skin retaining rail 8 is additionally supported by means of the axial lock 52.

To lower the folding top from the closed position so far explained into the compartment 3 for the top, firstly closures (not shown) on the frame of the wind screen 4 have to be released and the compartment 3 for the top opened. Since the top compartment cover lies underneath the roof skin retaining bow 9 (in a way not illustrated; compare the above-noted application filed on even date herewith), the roof skin retaining bow 9 must first be folded forwards by approximately 90° in order that the opposingly attached top compartment cover can be swung up rearwards. In the process, due to its end articulation on the roof skin retaining bow 9, the corner bow 10 is transferred essentially into the upright surface plane spanned by the latter. With open compartment 3 for the top, the folding top can then be lowered into the compartment 3 for the top by manual or power-assisted shifting of the upright main bow 11 through approximately 90°.

FIG. 3 shows the top framework after conclusion of a first phase of this opening operation. The perspective view was chosen in this case such that on the one hand the kinematic forcible actuation of the framework parts in the vehicle longitudinal plane and on the other hand the arrangement of the transverse bearing 23 can be clearly recognized. The transverse bearings 23 are hinge bearings, the struCture of which can be seen in conjunction with the enlarged detail according to FIG. 3a.

To form the transverse bearings 23, a fastening flange 56 is screwed onto each of the inward facing surfaces of the lateral roof frames 7, from which flange there protrudes a bearing bolt 57, rigidly connected to the fastening flange 56. The bearing bolts 57 extend upwards perpendicularly to the plane of the roof cap 5. Assigned to the bearing bolts 57 in each case, there is provided a fork flange 58, which is fixed to the roof cap and through the fork-shaped ends of which there pass transverse bores, matched to the diameter of the bearing bolt 57. For mounting, the bearing bolts 57 are inserted through the bores of the assigned fork flange 58 and secured axially by means of retaining rings 59 or the like.

The lateral roof frames 7 are thus connected in the plane of the roof cap 5 to the same, such that it can be deflected transversely outwards.

To achieve that the angle of deflection between the roof cap 5 and the two roof frames 7 are equal on both sides, in particular during the curse of the closing operation of the folding top, the transverse bearings 23 are loaded on both sides by means of a leg spring 60. The leg spring 60 is in each case wound between the fork-shaped ends of the assigned fork flange 58 around the bearing bolt 57 and is supported by its free legs on the fork flange 58 on the one hand and on the fastening flange 56 on the other hand. Due to the equal spring force on both sides brought about by this, a state of equilibrium is created, as a result of which the roof cap 5 is guided in a mirror-symmetrical position to the center longitudinal plane of the convertible 1 during the course of the folding operation of the top.

During the shifting of the main bow 11, the latter is swung downwards about a vehicle transverse axis defined by the main bearings 15. Due to their arrangement on the struts 16 in the main bow transverse plane, the roof skin retaining rails 8 take part in this swing-back movement. Similarly, the articulation points of the roof skin guide arms 24 on the roof struts are also moved on a corresponding circular path, the movement of the main bow 11 being transferred to the lateral roof frames 7 by means of the roof frame guide arms 24. However, at the ball joints 22, at the same time another momentum is introduced into the lateral roof frames 7, which is directed forwards and downwards. This momentum Comes from the main guide arms 18, which are swung forwards oppositely to the main bow 11. The opposing swivelling of the main guide arms 18 takes place by the hinge joints 19 being moved clockwise on a circular path around the main bearing 15 during the swinging back of the main bow 11, because the change-over lever 21 articulated on the bracket is connected to the assigned main guide arm 18 above the hinge joints 19. This produces a forwards directed relative rotation of the main guide arm 18 about the ball joints 22b' of the change-over guide arms 21. Since the struts 16, together with the assigned main guide arm 18, the roof frame guide arm 24 and the assigned lateral roof frame 7, in each case form a parallelogram-like rod transmission, the lateral roof frames 7 move with their upper narrow side towards the struts 16 until they are stowed closely above the same when the folding top is completely lowered.

In the turning-over movement of the lateral roof frames 7, the distance between the roof cap 5 and the bow tube 17 is inevitably reduced, so that the roof skin (not shown) folds increasingly. Since the intermediate bow 12 is fixed to the roof skin, during the course of the roof skin folding, it folds rearwards about the vehicle transverse axis formed by the articulation of its leaf-spring elements 25 on the roof frame guide arms 24, reaching its end position after a folding angle of virtually 180°.

The corner bow 10 is, on the other hand, not fastened to the roof skin and is therefore fastened in its middle region to the bow tube 17 by means of a retaining strap 61.

The roof skin retaining bow 9 is also affected by the swing-back movement of the main bow 11, since the bearing sections 16a are in connection with the roof skin retaining bow 9 by means of the guide levers 30 and the coupling rod 27. In the swing-back movement of the main bow 11, the articulation points of the guide levers 30 and the coupling rods 27 on the bearing section 16 are moved clockwise on a circular path around the main bearing 15. As a result, the thrust rod 28 is swivelled anti-clockwise about its articulation point on the bracket. This swivelling movement is accompanied by a longitudinal advancement of the entire roof skin retaining bow 9 forward due to the connection of the thrust rod 28 to the angled-off leg 9a of the roof skin retaining bow 9. The longitudinal advancement is designed such that the roof skin retaining bow 9 can submerge through the opening of the compartment 3 for the top into the latter. For this purpose, the advancement movement of the roof skin retaining bow 9 is superimposed by a lowering movement. This lowering movement comes about due to a parallelogram-like movement control by the thrust rod 28 in combination with the guide lever 30.

For compact clustering of all framework parts arranged in the side wall region of the folding top, there is further provided a control of the top framework in the vehicle transverse plane.

The effect of this control after the first phase of the opening movement is clearly recognizable from a comparative consideration of FIGS. 2 and 2a-2c with FIGS. 4 and 4a-4c. Since the struts 16 and the lateral legs of the roof skin retaining bow 9 move during the course of the swing-back movement of the main bow 11 only in folding planes which run parallel to the center longitudinal plane of the convertible 1 and additionally align with the side extensions of the compartment 3 for the top, all other linkage parts lying in the side wall of the top framework are moved as close as possible to these folding planes.

In the case of the lateral roof frames 7, this movement is accomplished by the two ball joints 22 being moved outwards synchronously in the sense of an increase in distance, as a result of which the roof frames 7 are no longer disposed parallel to each other but, with even deflection at the transverse bearings 23, increasingly trapezoidal with respect to the roof cap 5.

The moving apart of the ball joints 22 comes about automatically by virtue of the fact that the axial direction of the hinge joints 19 of the main guide arms 18 in each case runs approximately perpendicular to the swivelling plane of the assigned strut section 16b. Since the strut sections 16a are inclined inwards somewhat from the perpendicular, this design of the joints leads to an increasing spreading movement of the main guide arms 18 outwards when the latter are swung forwards. In order that this does not cause any joint twisting due to the change-over guide arms 21 acting on the main guide arm 18, the change-over guide arm 21 is provided at its end with ball joints 22b, 22b' which are capable of absorbing the tumbling movement of the change-over guide arm 21 free from stress.

To a somewhat lesser extent than the distance between the ball joints 22, the distance between the articulation point of the roof frame guide arms 24 on the lateral roof frames 7 also increases. Therefore, the end joints of the roof frame guide arms 24 are designed as ball joints 22a. The leaf-spring elements 25 of the intermediate bow 12, supported between the roof frame guide arms 24, compensate for their increase in distance at the roof frames by flexural bending deformation.

At the same time as the transverse deflection of the lateral roof frames 7 outwards towards the swivelling plane of the roof struts 16, the roof skin retaining rails 8 are moved out of their spread-apart stretching position in the opposite direction towards the assigned swivelling plane of the strut section 16b, where, after conclusion of the first opening phase of the folding top, they lie closely alongside the strut sections 16b of the top is a folded-in position.

In order to bring about this folding-in movement of the roof skin retaining rails 8 automatically, the relative turning of the main guide arms 18 relative to the strut sections 16b of the top taking place in the first phase of the opening movement of the folding top is utilized for the drive.

Figure 4A:
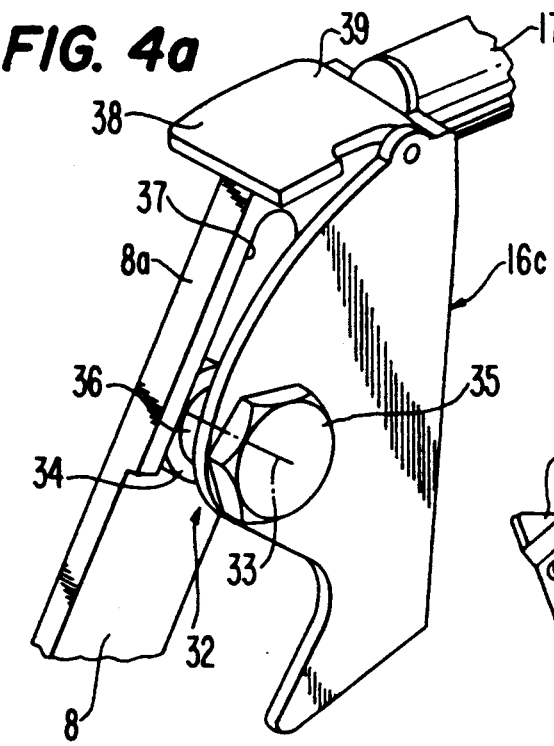
FIG. 4a is an enlarged detail view which shows the upper connection region of the roof skin retaining rail in the assigned folding position of FIGS. 3 and 4.
Figure 4C:
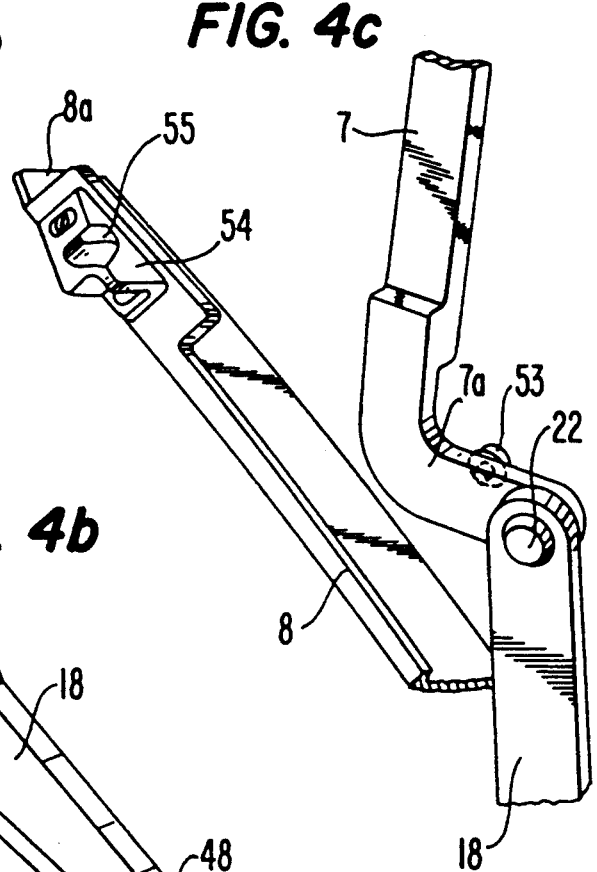
FIG. 4c is an enlarged detail view which shows the disengaged roof skin retaining rail.
Figure 4B:
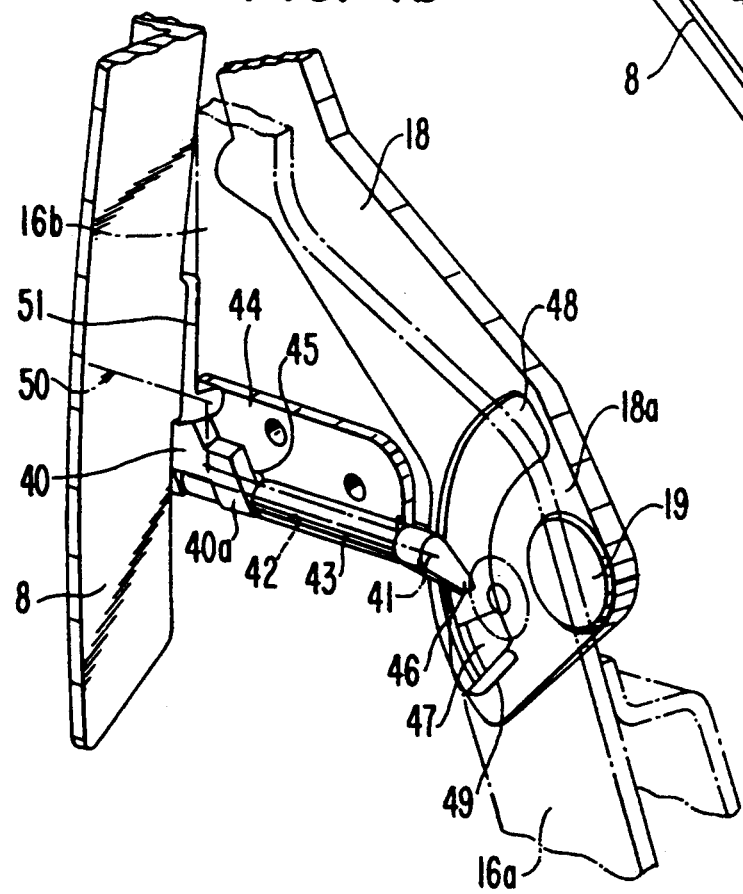
FIG. 4b is an enlarged detail view which shows the lower connecting region of the roof skin retaining rail in the assigned folding position of FIGS. 3 and 4.

As can be seen from FIG. 4b, the driving finger 46, engaging in the through-opening 47 of the control cam 18a, is tilted downwards anti-clockwise through an angle of approximately 60° by turning of the control cam 18a about the hinge joint 19, in which process it has left the through-opening 47 and is supported by its free end on the bottom of the depression 48. Due to its rotationally-fixed connection to the hinge bolt 42, the tilting movement of the driving finger 46 leads to a turning of the same in the same direction through the same angle. As a result, the spreader lever 40 is also swung upwards about the hinge axis 41 until it has reached its upright position shown. Due to the connection of the spreader lever 40 to the roof skin retaining rail 8 by means of the hinged joint 50, the drive movement of the driving finger 46 is transferred in the form of a swinging-in movement to the roof skin retaining rail 8. This swinging-in movement is, however, superimposed at the same time by a longitudinal advancement of the roof skin retaining rail 8, which is thereby displaced upwards. The vertical advancement of the roof skin retaining rails 8 has an advantageous effect because in this case, when the top is closed, the lower end of the roof skin retaining rails 8 can lie in an overlapping way on the side-boards 13, which simplifies the sealing of the folding top at the side-boards. Since the vertical advancement of the roof skin retaining rails 8 takes place right at the beginning of the swing-back movement of the main bow 11, the folding operation of the top is not impeded by this.

The longitudinal advancement of the roof skin retaining rail 8 is accommodated at the upper end of the same by the turning and sliding guide 32, by the edges of the sliding piece 8a limiting the longitudinal slit 37 sliding along on the circumference of the front pin 36.

As can be seen from FIG. 4a, which shows the upwardly displaced end position of the roof skin retaining rail 8, shortly before reaching its end position, the upper end of the sliding piece 8a hits the rear surface of the deflector cap 38 and lifts it up somewhat. The deflector cap 38 is taken along by the impact of the sliding piece 8a and swung upwards somewhat about the swivel axis 39, the material of the top being raised somewhat in this region. As a result, the laterally no longer tight roof skin is drawn upwards somewhat, which facilitates the entry operation into the compartment 3 for the top. Although a raising of the material of the top would also be conceivable without deflector caps 38 with the front end of the sliding piece 8a, this would entail the risk of too great a degree of wear of the roof skin on account of abrasion points.

A precondition for a longitudinal advancement of the roof skin retaining rail 8 to take place in the first place is, however, the releasing of the axial 1 lock 52 between the end section 7a and the sliding piece 8a. The releasing of this axial lock 52 takes place right at the beginning of the folding-in operation, when the main guide arm 18 has been swung forwards only a few degrees of angle. In the process, the transverse bolt 53 fixed to the end section slides out of the entry cross-section 55, so that the blocking of the roof skin retaining rail 8 is subsequently released. Allowance must be made for the clearance necessary for this on the driving finger side by a somewhat overdimensioned through-opening 47.

Thereafter, the transverse pin 53, which can be recognized in conjunction with FIG. 4c, can move with the end section 7a independently of the abutment.

On further swinging back of the main bow 11 from its position corresponding to FIG. 4, the two roof skin retaining rails 8 retain their folded-in position, although the main guide arms 18 continue to be swung forwards, as a result of which the control cam 18a also turns about the hinge joint 19. This is made possible by the fact that the bottom of the depression 48 runs parallel to the swivelling plane of the control cam 18a, as a result of which there occurs during the course of the further forward-folding movement of the main guide arm 18 merely a sliding operation of the supported end of the driving finger 46 on the bottom of the depression 48, without its angular position changing. The length of the depression 48 is in this case dimensioned such that the main guide arm 18 can be lowered into its stowage position in the compartment 3 for the top, recognizable from FIG. 5. In this stowage position, its ball joint 22 lies a vertical distance above the assigned main bearing 15, off-set rearwards somewhat relative to the latter, as a result of which the stowage position of the lateral roof frame 7 is fixed. The roof frame 7 is swung rearwards by approximately 180° in the ball joint 22 relative to the main guide arm 18, where it extends obliquely rearwards, crossing the main guide arm 18, in such a way that its end at the roof cap lies on the same level as the ball joint 22. In order to make possible a crossing of the main guide arm 18 with the roof frame 7, the main guide arm 18 is bent off towards the center longitudinal plane of the vehicle in the region of the swivelling coverage. As a result, the roof frame 7 and the assigned main guide arm 18 can be arranged alongside each other in the crossing region and, as can be recognized in conjunction with FIG. 5a, adjoining from there one above the other in approximately a common longitudinal alignment. In the stowage position shown of the lateral roof frames 7, the ball joints 22 have their maximum distance from each other, so that the lateral roof frames 7 are swung outwards to the maximum about their transverse bearings 23 relative to the roof cap 5. As a result, roof frames 7 lie approximately in longitudinal alignment with the struts 16 stowed underneath the same and, seen from the side, essentially parallel to the struts 16 at a relatively small vertical distance. Between the frames 7 and struts 16 the roof cap 5 is stowed in such a way that its surface which faces the vehicle interior when the top is closed, faces upwardly when stowed. The bow tube 17 of the main bow 11 is disposed underneath the roof cap 5 and is covered upwardly approximately along the joining line between the transverse bearings 23. There also extend between the roof cap 5 and the bow tube 17 the leaf-spring elements 25, rearwards to the intermediate bow 12, which is behind the bow tube 17, runs parallel to the latter and is likewise covered upwards also by the roof cap 5. The leaf-spring elements 25 also extend, seen from the side, essentially parallel to the lateral roof frames 7 assigned to them, since they are forcibly transferred into this position due to the driving of the intermediate bow 12 by means of the increasingly folding skin of the top, the leaf-spring elements 25 having been swung downwards about their articulation point on the roof frame guide arm 24 through an angle of approximately 180°. Due to the spring characteristic of the leaf-spring elements 25, the distance changes of the roof frame guide arms 24 thereby executing a tumbling movement can be absorbed by elastic elongation. After conclusion of this tumbling movement of the roof frame guide arms 24, which is made possible by their articulation by ball joints 22a, the roof frame guide arms 24 extend, seen from the side, from the plate connecting flange 16c obliquely forwards and upwards towards the assigned lateral roof frame 7 and extend, seen from above, on the inside of the assigned roof frame 7 essentially parallel to the strut section 16b.

In the horizontal plane of the strut sections 16b, in connection with the plate connecting flanges 16c lying in the same plane and also the bow tube 17, there is also arranged the completely lowered roof skin retaining bow 9, which encloses the named components around the periphery.

The lowering operation of the roof skin retaining bow 9 during the course of the folding-back operation of the main bow 11 comes about in the way already explained by the control at the struts by means of the guide levers 30 and the combination of the thrust rods 28 and the coupling rods 27.

Finally, the corner bow 10, lying somewhat underneath the main bow 11 in its stowage position, is held during the folding-back of the top by the retaining strap 61, until it hits the bottom of the compartment 3 for the top. Subsequently, during further folding-back of the top, only the flexible retaining strap 61 folds up. If the folding top is in the position corresponding to FIG. 5 or FIG. 5a in the compartment 3 for the top, the latter can be closed by means of the assigned cover, so that the folding top is stowed in it, concealed from the outside.

Figure 5:
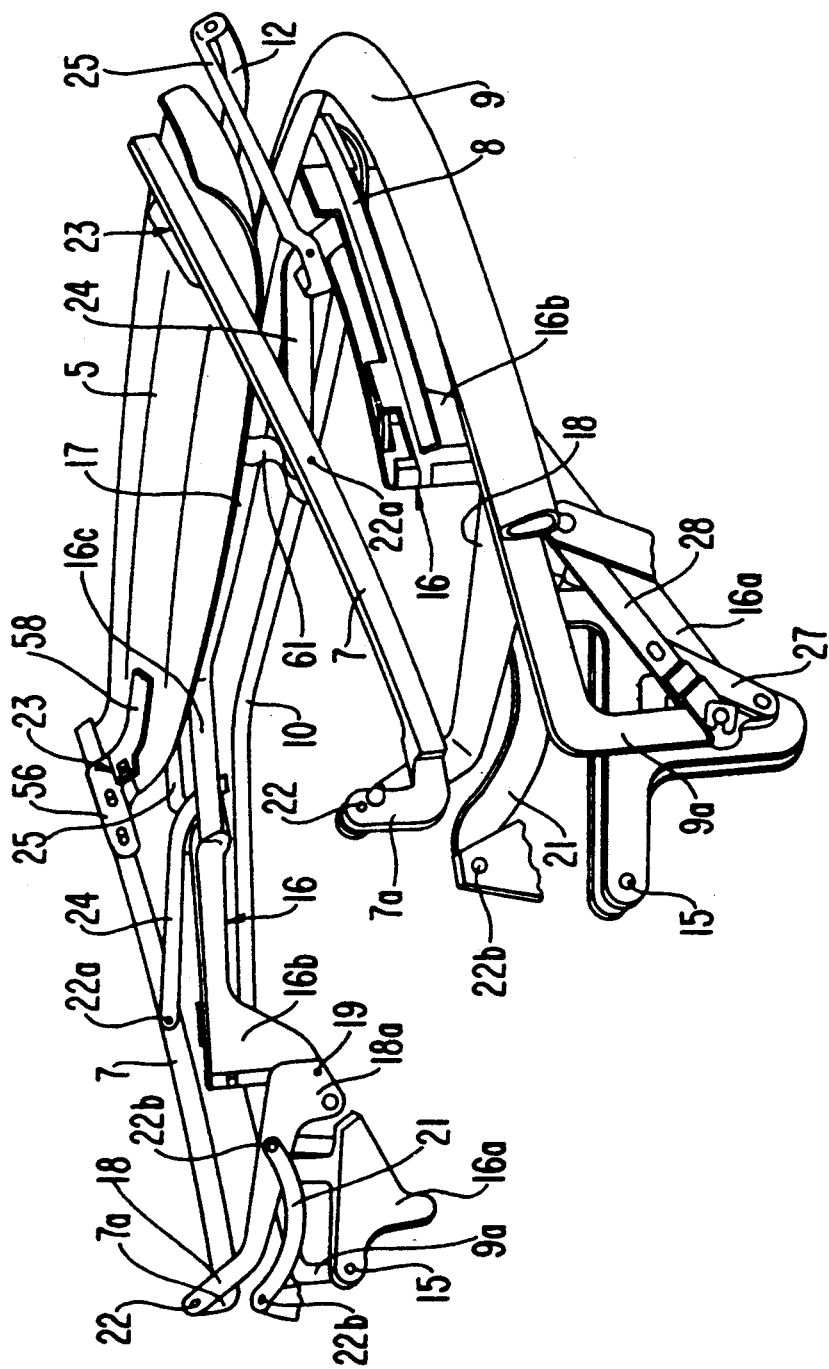
FIG. 5 shows the completely folded-back top framework in a perspective overall view.

Even if it should appear from superficial consideration that the lateral parts of the linkage are not folded all that compactly when they are in their stowage position in the compartment 3 for the top corresponding to FIG. 5 and FIG. 5a, this is a false impression, in particular because the roof skin has not been represented for reasons of clarity. However, the roof skin fills up virtually all the space in the compartment 3 for the top not taken up by parts of the linkage.

If the folding top is to be closed again, after opening of the compartment 3 for the top, the main bow 11 is swung forwards again into its upright position. The mechanical forced control described of all framework parts of the folded top dependently on the swivel angle of the main bow 11 results in the sequence of movements of the top framework described for the opening operation to take place automatically in the reverse order, the initial position shown in FIG. 1 being adopted again.

For further structural simplification, the ball joints 22a and 22b and 22b' could alternatively be designed as elastomer bearings, since such elastomer bearings permit not only the swivelling movement in one plane but also angular movements out of this plane. This alternative would also allow the tumbling movements of the roof frame guide arms 24 and of the change-over guide arms 21 to be performed free from stress.

Due to the relatively small transverse deflection of the lateral roof frames 7 in the transverse bearings 23, embodiments are also contemplated where the transverse bearings are designed as flexurally resilient joints. In the simplest case, these flexible joints could be formed by the bending axis of a leaf-spring shaped at a right angle, the one angled-off leg of which could be fastened similarly to the fork flange 58 to the roof cap 5 and the second leg of which could be fastened similarly to the fastening flange 56 to the lateral roof frame 7. At the same time as the transverse bearing function, through the bending axis of the leaf-spring, this would also produce the restoring force, so that no additional spring elements would be necessary.

Furthermore, elastomer bearings are, however, likewise contemplated in certain preferred embodiments as a replacement for the described transverse bearings 23, these elastomer bearings obtaining the necessary restoring force for the lateral roof frames 7 from elastomeric deformation of elastomer bushes or the like.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Top framework of a folding top for a vehicle comprising:
 a main bow pivotable about a horizontally extending vehicle transverse axis, the main bow having a top member and side struts extending outwards and downwards from the top member when the main bow is in an upright position, each side strut having a strut section which extends downwardly more steeply than a lateral contour of the vehicle and with an inward offset therefrom;

a roof skin retaining rail linked laterally outside of each of the strut sections of the main bow on each side of the vehicle, each of the roof skin retaining rails being transferable between a roof skin stretching position lying essentially flush with a surface plane of a side wall of the folding top when the main bow is in the upright position and a folding position moved closer to an associated strut section;

a lateral roof frame positioned at each side of the main bow adjacent to an associated side strut of the main bow when the main bow is in the upright position;

further framework means connected to at least one of the lateral roof frames for coupling each of the lateral roof frames to the main bow so that during a shifting of the main bow from the upright position, each of the lateral roof frames is forcibly controlled into a stowage position adjacent to and substantially parallel to the strut section of the associated side strut of the main bow; and a front roof frame interconnecting each of the lateral roof frames and including hinge means for permitting deflection of ends of the lateral roof frames remote from the hinge means transversely outwards as the main bow is shifted from the upright position to the stowage position.

2. Top framework according to claim 1, wherein each of the lateral roof frames is pivotally mounted by the further framework means for movement about an axis extending at least approximately perpendicular to a longitudinal axis of the strut section of the associated side strut.

3. Top framework according to claim 1, wherein each of the lateral roof frames is a continuous bar profile, a longitudinal extent of each of the bar profiles being substantially equal to a length of the associated side strut.

4. Top framework according to claim 1, wherein each of the lateral roof frames is attached to the associated side strut by a positionally stabilized main guide arm and a roof frame guide arm of the further framework means for guiding each lateral roof frame, during the shifting of the main bow, from the position approximately perpendicular to the longitudinal axis of the associated side strut to a position turned through approximately 90° and displaced in parallel with respect to the associated side strut so that the front roof frame is positioned in a stowed position approximately parallel alongside the top member of the main bow.

5. Top framework according to claim 4, wherein each of the main guide arms is positionally stabilized by a change-over guide arm supported on a vehicle structure.

6. Top framework according to claim 5 wherein each of the positionally stabilized main guide arms is mounted approximately above a vehicle side-board upper edge on an associated strut section, wherein each of the positionally stabilized main guide arms extends upwards essentially in parallel with the associated strut section when the main bow is in the upright position, wherein an upper end of each of the positionally stabilized main guide arms is articulated at an articulation point at a rear end of an associated lateral roof frame, and wherein each of the roof frame guide arm is mounted with one end on an associated side strut offset vertically with respect to the articulation point of the main guide arm on the associated lateral roof frame, and with an other end on an associated lateral roof frame offset in a forward direction with respect to the articulation point of the main guide arm on the lateral roof frame.

7. Top framework according to claim 6, wherein the rear end of each of the lateral roof frames is formed by a downward angled-off section, to a lower end of which an associated main guide arm is adjoined.

8. Top framework according to claim 6, wherein an axial direction of a hinge joint at a lower end of each of the main guide arms extends approximately perpendicular to the longitudinal axis of the associated strut section, and wherein an upper end of each of the main guide arm is connected by a ball joint to the associated lateral roof frame at the articulation point thereof.

9. Top framework according to claim 7, wherein each roof frame guide arm and each change-over guide arm is mounted at both ends by bearing means for deflection transversely outward.

10. Top framework according to claim 9, wherein ball joint bearings are provided as the bearing means for mounting each main guide arm and each change over guide arm.

11. Top framework according to claim 1, wherein the lateral roof frames are connected by spring-loaded hinge bearings to the front roof frame.

12. Top framework according to claim 8, wherein transfer of each of the roof skin retaining rails into the folding position nearer to the associated strut sections takes place automatically by a control means utilizing the relative movement between each of the side struts and associated main guide arms during the pivoting of the main bow.

13. Top framework according to claim 12, wherein the control means comprises a control cam connected to each of the main guide arms fixedly in terms of rotation, and arranged around the axial direction of a hinge joint having a joint axis, the hinge joint being positioned at the lower end of each of the main guide arms between each of the main guide arms and associate side strut.

14. Top framework according to claim 13, wherein the control means further comprises a spreader lever supported between each side strut and associated roof skin retaining rail, each of the spreader levers being actuable upon a relative deflection of an associated main guide arm with respect to an associated side strut by means of the control cam, each spreader lever being articulated at ends thereof on the associated side strut and on the associated roof skin retaining rail, a combination of a swivel mounting and a sliding mounting being provided for each of the roof skin retaining rails between upper ends of each of the roof skin retaining rails and associated side struts.

15. Top framework according to claim 14, wherein a driving finger juts out to support each of the spreader levers, each of the driving fingers being fixed to an associated spreader lever and engaging a control track of as associated control cam.

16. Top framework according to claim 15, wherein each of the control tracks is formed by a depression in a lateral side of the associated control cam extending in the form of an arc around the joint axis of the hinge joint, a longitudinal extent of each of the depressions being matched to a swivel angle deflection of the associated main guide arms relative to an associated strut, each of the driving fingers being respectively supported by a free end thereof on a bottom of the depressions.

17. Top framework according to claim 16, wherein a through opening is provided in a front end region of each of the depressions, through which opening the free end of each of the driving finger passes in a first phase of the swing-back movement of the main bow towards a top stowage position.

18. Top framework according to claim 17, wherein a link juts out from a front face end of each of the depressions in a direction of an associated side strut as a blocking stop and, to create each of the through-openings is disengaged from the associated control cam and is bent out into the jutting-out blocking position.

19. Top framework according to claim 1, wherein locking elements are provided on both sides between angled-off end sections of the lateral roof frames and the roof skin retaining rails, by means of which locking elements the roof skin retaining rails are blocked axially when the main bow is fully upright.

20. Top framework according to claim 19, wherein a transverse pin juts out from the end sections of each of the lateral roof frames and faces an associated roof skin retaining rail, each of the transverse pins entering a fork-shaped abutment of each of the roof skin retaining rails during the course of the relative movement of the end sections to the associated roof skin retaining rail in the operation of moving the main bow upright.

21. Top framework according to claim 20, wherein a clear entry cross-section of the abutments are tapered in the form of a wedge, seen in the direction of entry, to a diameter of the transverse pin.

22. Top framework according to claim 21, wherein the transverse pin is conically shaped.

* * * * *

UNITED STATES PATENT AND TRADEMARK OFFICE
CERTIFICATE OF CORRECTION

PATENT NO.   :   5,004,291

DATED        :   April 2, 1991

INVENTOR(S)  :   Theodor Bauer, Gerhard Zweigart

It is certified that error appears in the above-identified patent and that said Letters Patent is hereby corrected as shown below:

On the title page the Assignee should read:
[73]   Assignee:   Daimler-Benz AG, Fed. Rep. of Germany Signed and Sealed this Twenty-fifth Day of August, 1992

Attest:

DOUGLAS B. COMER

Attesting Officer

Acting Commissioner of Patents and Trademarks